United States Patent
Han et al.

(10) Patent No.: US 9,321,033 B2
(45) Date of Patent: Apr. 26, 2016

(54) PROCESS FOR THERMAL FIXATION OF CATALYTICALLY ACTIVE COMPONENT ONTO ALUMINA SUPPORT

(71) Applicant: HEESUNG CATALYSTS CORPORATION, Gyeonggi-do (KR)

(72) Inventors: Hyun-sik Han, Gyeonggi-do (KR); Seung Chul Na, Gyeonggi-do (KR); Sang Yun Han, Gyeonggi-do (KR)

(73) Assignee: Heesung Catalysts Corporation, Gyeonggi-Do (KR)

( * ) Notice: Subject to any disclaimer, the term of this patent is extended or adjusted under 35 U.S.C. 154(b) by 131 days.

(21) Appl. No.: 14/376,356

(22) PCT Filed: Feb. 4, 2013

(86) PCT No.: PCT/KR2013/000858
§ 371 (c)(1),
(2) Date: Sep. 30, 2014

(87) PCT Pub. No.: WO2013/115612
PCT Pub. Date: Aug. 8, 2013

(65) Prior Publication Data
US 2015/0051068 A1    Feb. 19, 2015

(30) Foreign Application Priority Data
Feb. 2, 2012 (KR) .................. 10-2012-0010635

(51) Int. Cl.
*B01J 23/00* (2006.01)
*B01J 21/04* (2006.01)
(Continued)

(52) U.S. Cl.
CPC *B01J 21/04* (2013.01); *B01J 23/42* (2013.01); *B01J 23/44* (2013.01); *B01J 37/0201* (2013.01); *B01J 37/08* (2013.01); *B01D 53/944* (2013.01); *B01D 2255/1021* (2013.01);
(Continued)

(58) Field of Classification Search
CPC ........ B01J 23/42; B01J 23/44; B01J 37/0201; B01J 37/08
USPC ....................................................... 502/335
See application file for complete search history.

(56) References Cited

U.S. PATENT DOCUMENTS
2008/0210222 A1    9/2008 Vanoppen et al.

FOREIGN PATENT DOCUMENTS
JP    2011110509 A  *  6/2011
KR    100916765 B1     9/2009
KR    20110053139 A    5/2011

OTHER PUBLICATIONS
International Search Report and Written Opinion for PCT/KR2013/000858, mailed May 13, 2013.

*Primary Examiner* — Colleen Dunn
*Assistant Examiner* — Haytham Soliman
(74) *Attorney, Agent, or Firm* — Meunier Carlin & Curfman LLC

(57) ABSTRACT

The present invention relates to an improvement in a process for the thermal fixation of a catalytically active component onto an alumina support and, more specifically, to an improvement in a process for the thermal fixation of a catalytically active component onto an alumina support for preparing a thermally stable catalyst for treating exhaust gas from an internal combustion engine, by means of thermally stable dispersion and fixation of the catalytically active component(s) for treating exhaust gas from an internal combustion engine, onto a surface or an internal space of the alumina support.

8 Claims, 3 Drawing Sheets

(51) Int. Cl.
  *B01J 37/08* (2006.01)
  *B01J 23/44* (2006.01)
  *B01J 37/02* (2006.01)
  *B01J 23/42* (2006.01)
  *B01J 37/03* (2006.01)
  *B01D 53/94* (2006.01)
  *B01J 35/04* (2006.01)

(52) U.S. Cl.
  CPC ................ *B01D 2255/1023* (2013.01); *B01D 2255/2092* (2013.01); *B01J 35/04* (2013.01); *B01J 37/038* (2013.01)

PROCESS FOR THERMAL FIXATION OF CATALYTICALLY ACTIVE COMPONENT ONTO ALUMINA SUPPORT

TECHNICAL FIELD

The present invention relates to an improvement in a process for thermally fixing a catalytically active component onto an alumina support and, more specifically, to an improvement in a process for thermally fixing a catalytically active component onto an alumina support for preparing a thermally stable catalyst for treating exhaust gas discharged from an internal combustion engine, by stably dispersing and fixing the catalytically active component onto the surface of the aluminum support or into the internal space thereof.

BACKGROUND ART

The present invention relates to an improvement in a catalyst for treating exhaust gas discharged from an internal combustion engine to remove pollutants from the exhaust gas. More particularly, the present invention relates to an improvement in a process for preparing a thermally stable catalyst used in the treatment of vehicle exhaust gas. As well known, there is disclosed a catalyst including one or more kinds of precious metals dispersed within the internal space of a high surface area support and on the surface thereof. A refractory ceramic material-made monolithic carrier is coated with the precious metal-dispersed support in the form of slurry (washcoat). As the support, an activated alumina support, particularly, a high surface area alumina support having a BET surface area of 60 $m^2/g$ or more, for example, 150 $m^2/g$ or more or 200 $m^2/g$ or more, is used. Here, activated alumina is a mixture of gamma-alumina and delta-alumina. A typical catalyst is composed of a small amount of a platinum-group metal such as platinum or palladium dispersed in the internal space of an activated alumina support and on the surface thereof, and additionally includes at least one of rhodium, ruthenium and iridium. An alumina support containing such a catalytically active component is applied onto a honeycombed monolithic carrier provided with many gas channels in the form of fine slurry, called washcoat. The common problem with catalysts for exhaust gas treatment is that an activated alumina support is thermally decomposed when a catalyst is exposed to high-temperature exhaust gas of an internal combustion engine for a long period of time. For example, the temperature of automobile exhaust gas may be 1000° C. or more. Due to the high temperature, an activated alumina support is constricted in volume under the presence of vapor and is converted into a low surface area alumina support, and thus catalytically active components are confined in the constricted support, so the exposed surface area of a catalyst is reduced, thereby deteriorating catalytic activity. Further, owing to the high-temperature exhaust gas, catalytically active components may be separated from the alumina support or may be transposed. Therefore, in a process of preparing a catalyst, it is required that catalytically active components be strongly fixed on the alumina support.

There are disclosed methods of preparing an alumina support and processes of fixing catalytically active components onto a support. For example, U.S. Pat. No. 6,288,007 discloses an alumina support having a surface treated with silica by impregnation or vapor deposition. In the impregnation, first, a silicon compound solution is formed, an alumina support makes contact with the solution, and the support is treated with air or water, thus converting silicon compound into silicon oxide (silica). Further, Korean Patent Application Publication No. 2011-0109625 discloses a method of preparing mesoporous alumina, including the steps of: mixing a surfactant and an alumina precursor with alcohol and distilled water, stirring the mixture and then separating solid matter; and drying and calcinating the solid matter.

DISCLOSURE

Technical Problem

In order to thermally fix a catalytically active component such as a platinum group element onto a catalyst support such as an alumina support, a mixture of a catalyst support and a catalytically active component is mixed with a predetermined medium, and then semi-dried impregnating powder having a water content of about 30% is introduced into a calcinatory or a reactor to directly bring the mixture into contact with a flame. In this case, in the reactor, platinum-group precursor materials are decomposed into platinum-group components and precursor-decomposed products. Here, the platinum-group components are fixed on the surface of an aluminum support or in the internal space thereof, and the precursor-decomposed products, such as nitric acid, hydrochloric acid and the like, are gasified and then collected in so-called back-filter. However, in this case, there is a problem that semi-dried impregnating powder is formed into fine powder (5 μm or less) by a calcinations reaction for direct heating, thus contaminating the back-filter and retarding the fixation of platinum-group components on the support.

Technical Solution

In order to solve the above problems, the present inventors found that when a conventional semi-dry impregnating powder was pretreated into a quasi-dry impregnating powder having a predetermined water content, preferably, a water content of 5% or less and then this quasi-dry impregnating powder was treated in a direct heating type calcination reactor, the degree of contamination of a back-filter could be reduced, and, surprisingly, the reaction of fixing a platinum group component onto a support could be rapidly processed. Based on the finding, the present invention was completed.

An aspect of the present invention provides a method of thermally fixing a catalytically active component onto an alumina support according to the present invention includes the steps of: a) preparing impregnating powder containing alumina powder and a catalytically active component; b) stirring and heating the impregnating powder in a heating mixer provided on an outer wall thereof with a steam jacket to obtain quasi-dry impregnating powder having a water content of 5% or less; c) introducing the quasi-dry impregnating powder having a water content of 5% or less into a indirect heating-type upright screw reactor; d) carrying the introduced impregnating powder from an upper end of the reactor to a lower end thereof; and e) obtaining an alumina support product from the lower end of the reactor.

The method of thermally fixing a catalytically active component onto an alumina support according to the present invention is non-limitedly characterized as follows. That is, the method may further include the step of discharging powder-mixed vapor produced in step b). Further, the method may further include the step of discharging powder-mixed vapor produced in step b). Further, the method may further include the step of applying air pressure into the reactor through the upper end of the reactor in step d). Further, the method may further include the step of adjusting a feed rate into the reactor between step b) and step c). Here, the step of adjusting the feed rate into the reactor may be conducted by a horizontal screw feeder. Further, the impregnating powder introduced in step d) may be carried from the upper end of the reactor to the lower end thereof within 7 seconds. Further, the method may further include the step of removing a gas-decomposed product obtained together with the alumina support product in step e). Further, another aspect of the present invention provides an alumina support comprising a catalytically active component, produced by the method.

Advantageous Effects

According to the present invention, a mixture of an alumina support and a precious metal component is primarily treated with semi-dried powder, and is then secondarily treated in a calcination reactor, thus providing the following advantages: 1) the degree of contamination of a back-filter can be reduced; 2) the fixation reaction of a precious metal component on a support can be rapidly accomplished; and thus 3) total process efficiency and productivity per unit time can be improved.

BEST MODE

The term "support" used herein is referred to as a material impregnated with a catalytically active material. Particularly, the support used herein includes a high surface area alumina material fixed on the surface thereof with a precious metal for providing a catalytic function. The term "alumina" is referred to as an aluminum oxide or any one of other metals and/or other metal oxides and mixtures thereof. Here, as the catalytically active material impregnated into the support, various kinds of materials containing precious metal component may be used, and, particularly, platinum-group components may be used. The terms "catalytic material", "active catalytic material", "platinum group" and "metal component" are reciprocally used, unless otherwise specified. The term "quasi-dry powder" is referred to as impregnating powder having a water content of 5% or less, which is obtained by further drying semi-dry powder having a water content of 30%. The term "thermal fixation" means that a catalytic component is semi-permanently fixed in the pores of a support or on the surface thereof by a calcinations process, and is designated as "thermal attaching". Hereinafter, a process for thermally fixing a catalytic material onto a support according to the present invention, that is, a process of impregnating a catalytic material into a support, will be described in detail with reference to the attached drawings.

Figure 1:
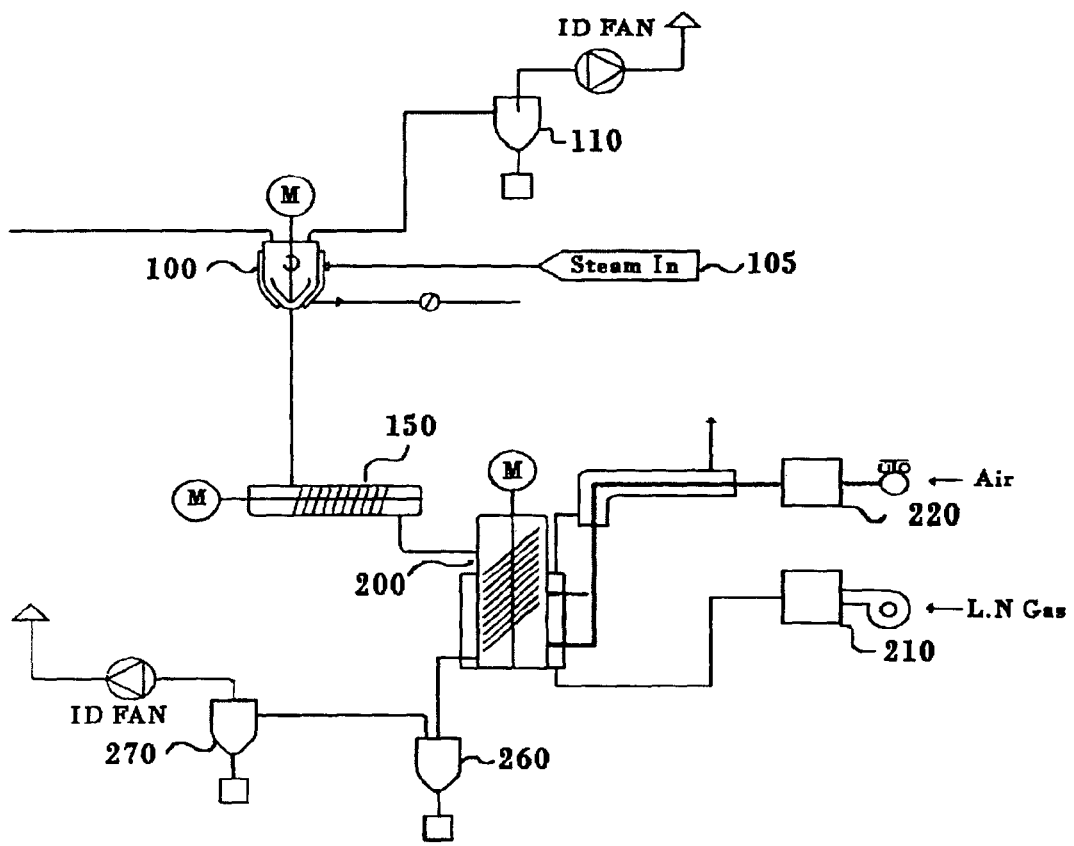
FIG. 1 is a schematic process view according to the present invention.
Figure 2:
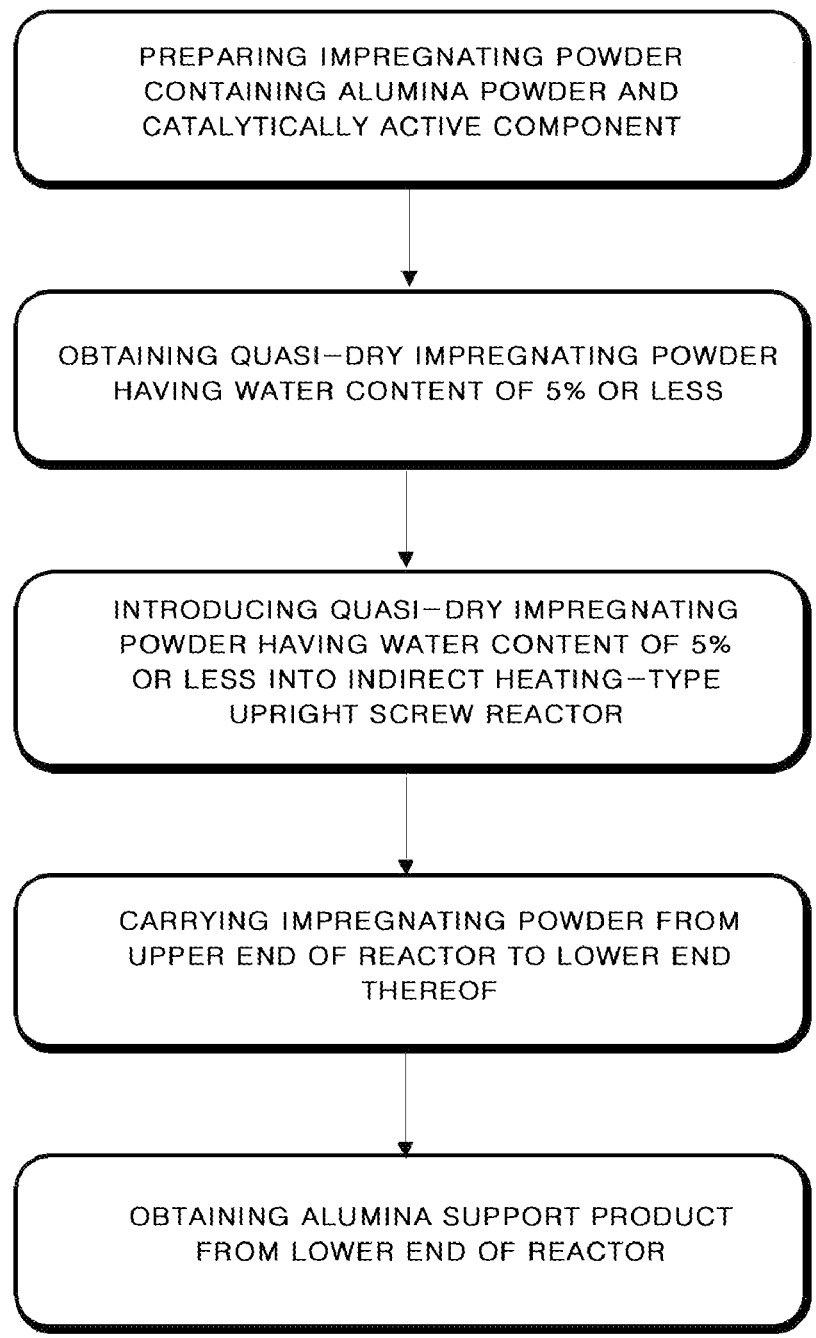
FIG. 2 is a process flow diagram according to the present invention.

FIGS. 1 and 2 schematically show the process according to the present invention. Describing the process according to the flow direction of reactants, this process includes: a heating mixer 100 for containing impregnating powder; a calcination reactor 200 for calcinating the quasi-dry impregnating power discharged from the heating mixer 100; and a horizontal screw feeder 150 disposed between the heating mixer 100 and the calcinations reactor 200 to supply the quasi-dry impregnating powder from the heating mixer 100 to the calcinations reactor 200. A fine powder recovery unit 110, which is communicably connected with the heating mixer 100, is provided in the vicinity of the heating mixer 100 to collect water-containing fine powder discharged from the heating mixer 100. A gas burner 210 generates high-temperature energy to indirectly heat the heating mixer 100 via the outer side of the calcination reactor 200. An air dryer 220 is provided in the vicinity of the calcinatory reactor 200 to continuously inject dry air into the calcination reactor 200 through the upper end thereof. As an alternative to the air dryer 220 or in combination with the air dryer 220, a hydrogen supply unit (not shown) may be provided. A catalytic component is fixed on an alumina support, and, if necessary, may be reduced. In this case, reducing hydrogen may be supplied from the hydrogen supply unit. As shown in FIG. 1, the calcination reactor 200 is provided at the lower end thereof with a cyclone for recovering calcinated power therefrom. In this case, gaseous by-products obtained from the calcination process, such as nitric acid, hydrochloric acid and water vapor, are collected in a back-filter 270. The heating mixer 100 is indirectly heated by a steam jacket for providing steam 105. The calcination reactor 200 is an upright reactor. The quasi-dry impregnating powder is introduced into the reactor 200 through the upper end thereof, and is then carried to the lower end thereof by the rotation of a screw provided therein. High-temperature heat is transferred from the gas burner 210 to the outer wall of the reactor 200, thus realizing a calcinations reaction for fixing a catalytic component onto alumina support. The upper end of the reactor is connected with the air dryer 220 and/or a hydrogen supply unit to supply a suitable amount of dry air and/or hydrogen into the reactor 200. In this case, dry air serves to accelerate the movement of reactants to be calcinated from the upper end of the reactor to the lower end thereof as well as to accelerate the calcinations reactor in the reactor. Referring to FIG. 1, the horizontal screw feeder 150 is disposed between the heating mixer 100 and the upright calcination reactor 200, and adjusts the feed rate of quasi-dry impregnating powder introduced into the reactor. According to the present invention, the screw speed of the horizontal screw feeder 150 and the rotation speed of a screw in the reactor 200 are adjusted such that reactants to be calcinated stay in the reactor having an internal temperature of 600 to 700° C. for 7 seconds or less. When the reactants stay in the reactor for more than 7 seconds, which can be changed depending on the physical properties thereof, the alumina support and the catalytic component may be denatured, and thus the reaction must be rapidly completed. The constituents for realizing the process according to the present invention were respectively described as above, but these respective constituents can be commercially designed by the selection of those skilled in the art. Hereinafter, in the process according to the present invention, the steps of thermally fixing a catalytic component into the inner space of the support and/or the outer surface thereof will be described.

The present invention provides a method of thermally fixing a catalytically active component onto an alumina support, including the steps of: a) preparing impregnating powder containing alumina powder and a catalytically active component; b) stirring and heating the impregnating powder in a heating mixer 100 provided on an outer wall thereof with a steam jacket to obtain quasi-dry impregnating powder having a water content of 5% or less; c) introducing the quasi-dry impregnating powder having a water content of 5% or less into a indirect heating-type upright screw reactor 200; d) carrying the introduced impregnating powder from the upper end of the reactor to the lower end thereof; and e) obtaining an alumina support product from a cyclone 260 connected to the lower end of the reactor. The quasi-dry impregnating powder obtained in step b) is collected in a fine powder recovery unit 110. In step d), air pressure is applied to the inside of the reactor 200 from an air dryer 220 through the upper end of the reactor 200 to accelerating the carrying and calcinating of reactants to be calcinated. The feed rate of the impregnating powder into the reactor 200 is adjusted using a horizontal screw feeder 150. According to an embodiment of the present invention, the impregnating powder introduced in step d) is carried from the upper end of the reactor to the lower end thereof within 7 seconds when the temperature in the reactor is 650° C. In step e), the gas-decomposed product obtained together with the alumina support product is removed by a back-filter 270 to reduce the degree of contamination over the entire process. Through the method of thermally fixing a catalytically active component onto an alumina support according to the present invention, an alumina support containing a pure catalytically active component can be rapidly prepared compared to a conventional process.

MODE FOR INVENTION

EXAMPLE

Active gamma alumina powder having a BET surface area of 130 m$^2$/g and a particle size (95 wt % of particles) of less than 50 μm was ball-milled in a predetermined medium under the presence of 1 wt % of platinum chloride and hydrochloric acid (36.5% HCl) to form alumina-impregnated powder having an average alumina particle size (90 wt % of particles) of less than 15 μm. The alumina-impregnated powder was introduced into a heating mixer 100. The water content of the alumina-impregnated powder was adjusted to 5% or less while maintaining the temperature in the heating mixture 100 at 120° C. The water-containing fine powder was collected in a fine powder recovery unit 110 connected with the heating mixer 100. The lower end of the heating mixer 100 was opened to introduce quasi-dry alumina-impregnated powder into an upright reactor 200 having a height of 500 mm through a horizontal screw feeder 150. The rotation speed of a screw in the reactor 200 and the screw speed of the horizontal screw feeder 250 are adjusted to maintain the calcination time of the alumina-impregnated powder in the reactor 200 at 7 seconds or less. The high-temperature heat supplied from a gas burner 210 is transferred to the outer wall of the reactor 200 to maintain the maximum temperature in the reactor 200 at 650° C. A small amount of dry air was introduced into the upper end of the reactor 200 to carry the alumina-impregnated powder calcinating in the reactor 200 downwards. The catalyst support completely-calcinated through the lower end of the reactor 200 was recovered from a cyclone 260. In this case, water-containing components, such as hydrochloric acid and the like, which are by-products of a calcination reaction, were collected through a back-filter 270. Alumina fixed with 1 wt % of platinum was prepared into a slurry (washcoat), and the slurry was applied to a monolithic carrier of 400 cell/in$^2$ and then calcinated in air at 400° C. for 1 hour.

Comparative Example

Alumina-impregnated powder having an average alumina particle size (90 wt % of particles) of less than 15 μm was formed in the same manner as in Example. The alumina-impregnated powder was dried by a conventional drying method to obtain a semi-dry alumina-impregnated powder, and this semi-dry alumina-impregnated powder was brought into contact with the flame in the reactor and calcinated to obtain a catalyst support. A slurry (washcoat) was formed in the same manner as in Example, applied to a monolithic carrier, and then calcinated.

The states of back-filters of Example and Comparative Example were examined. The back-filter of Comparative Example was attached with a large amount of fine powder to contaminate the entire process, but the degree of contamination of the back filter of Example was greatly reduced. Thus, in the subsequent process, an additional work for removing contaminants from the back-filter was omitted. Each of the supports prepared in Example and Comparative Example was formed into a slurry, the slurry is applied to a carrier, and then the degree of fixation of a catalytic component onto the support was evaluated. The degree of fixation thereof was measured by catalytic activity. It was ascertained that the catalytic activity can be maintained for a relative long time when a catalytic component is fixed onto the support by an indirect heating method after the removal of water.

Figure 3:
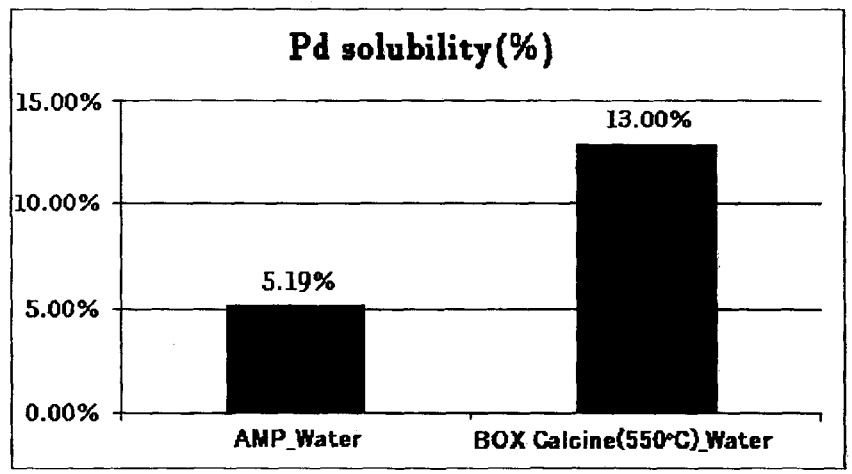
FIG. 3 is a graph comparing the solubility of precious metal according to the fixing method of the present invention with that of precious metal according to a convention method (BOX calcinations) when a support is prepared in the form of slurry, wherein water is used as a solvent.
Figure 4:
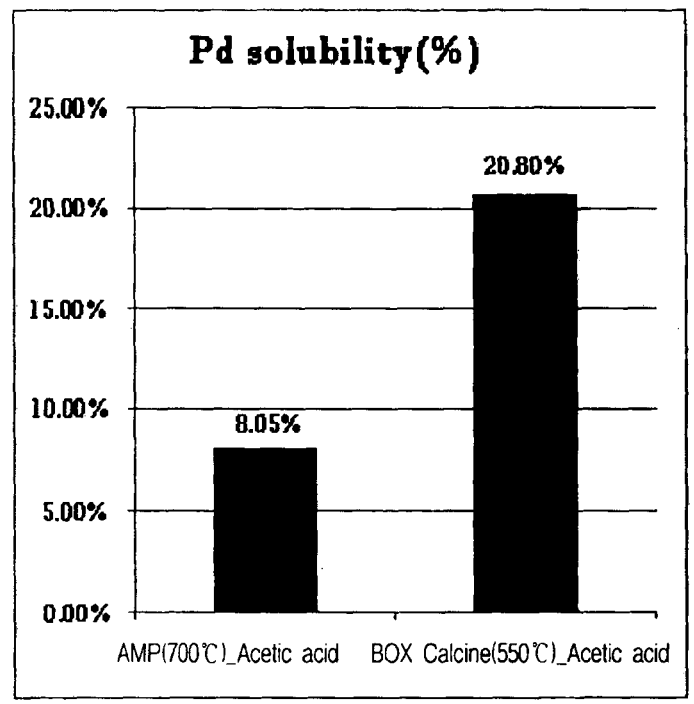
FIG. 4 is a graph comparing the solubility of precious metal according to the fixing method of the present invention with that of precious metal according to a convention method (BOX calcinations) when a support is prepared in the form of slurry, wherein acetic acid is used as a solvent.

Further, each of the supports prepared in Example and Comparative Example was formed into a slurry, and then the solubility of a precious metal in a solvent used in the formation of the slurry was measured. As shown from the results of FIGS. 3 and 4, it can be ascertained that the degree of fixation of a catalytic component onto the support was improved regardless of the kind of a solvent when the precious metal fixation method of the present invention was used compared to when a conventional method was used.

The invention claimed is:

1. A method of thermally fixing a catalytically active component onto an alumina support, comprising the steps of:
   a) preparing impregnating powder containing alumina powder and a catalytically active component;
   b) stirring and heating the impregnating powder in a heating mixer provided on an outer wall thereof with a steam jacket to obtain a quasi-dry impregnating powder having a water content of 5% or less and discharging a produced powder-mixed vapor;
   c) introducing the quasi-dry impregnating powder having a water content of 5% or less into an indirect heating-type upright screw reactor;
   d) carrying the introduced impregnating powder from an upper end of the reactor to a lower end thereof; and
   e) obtaining an alumina support product from the lower end of the reactor.

2. The method of claim 1, further comprising a step of applying air pressure into the reactor through the upper end of the reactor in step d).

3. The method of claim 1, further comprising a step of adjusting a feed rate into the reactor between step b) and step c).

4. The method of claim 3, wherein the step of adjusting the feed rate into the reactor is conducted by a horizontal screw feeder.

5. The method of claim 1, wherein the impregnating powder introduced in step d) is carried from the upper end of the reactor to the lower end thereof within 7 seconds.

6. The method of claim 1, further comprising the step of removing a gas-decomposed product obtained together with the alumina support product in step e).

7. The method of claim 2, further comprising a step of adjusting a feed rate into the reactor between step b) and step c).

8. The method of claim 7, wherein the step of adjusting the feed rate into the reactor is conducted by a horizontal screw feeder.

\* \* \* \* \*